United States Patent [19]

Scifres et al.

[11] 4,386,827

[45] Jun. 7, 1983

[54] ELECTROOPTICAL SCANNING DEVICE

[75] Inventors: Donald R. Scifres, Los Altos; Robert A. Sprague, Saratoga, both of Calif.

[73] Assignee: Xerox Corporation, Stamford, Conn.

[21] Appl. No.: 200,756

[22] Filed: Oct. 27, 1980

[51] Int. Cl.³ ............................................... G02F 1/03
[52] U.S. Cl. ..................................................... 350/356
[58] Field of Search ....................................... 350/356

[56] References Cited

U.S. PATENT DOCUMENTS 3,517,200  6/1970  Kalman .................................. 350/356
3,787,111  1/1974  Giordmaine et al. ................ 350/356

OTHER PUBLICATIONS

"Electrooptical Scanner", by Fleisher, *IBM Tech. Disclosure Bull.*, vol. 13, No. 12, May 1971.

*Primary Examiner*—William L. Sikes
*Assistant Examiner*—Leon Scott, Jr.
*Attorney, Agent, or Firm*—W. Douglas Carotaers, Jr.

[57] ABSTRACT

An electrooptical scanning device for deflection of an optical beam of light across an image plane. The device comprises a body of electrooptical crystal material and a periodic array of parallel, spaced electrodes associated with one surface of the body. A light beam entering the crystal body is caused to interact with electric fields established at the one surface by step applied voltages to the electrode array that influence the deflection of the light beam at the moment of total internal reflection at the one surface. By varying the magnitude of the applied voltages across the electrodes, a corresponding approximation of a desired phase retardation can be produced along the phase front of the light beam. The phase retardation across the light beam can be designed to produce a linear phase front angled beam or can be designed to produce a curvalinear phase front forming a focused spot at the image plane. With the changing of the magnitude of the applied voltages across the electrode array, the beam or spot may be made to move about or scan across the image plane.

22 Claims, 13 Drawing Figures

ELECTROOPTICAL SCANNING DEVICE

BACKGROUND OF THE INVENTION

This invention relates to electrooptical devices and more particularly to electrooptical scanning devices of the total internal reflection (TIR) type adapted specifically for beam or spot scanning.

Electrooptical devices have progressed in the art to provide a myriad of structures that operate on an electrooptic effect in a crystalline waveguide medium. Voltages are applied to an electrode array on the surface of the medium. These applied voltages cause the formation of a phase pattern in the medium which deflects and/or focuses the light wave propagating through the medium. This phenomenon occurs because an electric field, established in the medium by the voltages applied to the electrodes, varies the index of refraction of the medium sufficiently to change the relative phase of portions of the light wavefront as it propagates through the medium.

One type of electrooptic medium is the bulk electrooptic modulating device wherein the light wave is confined to a bulk crystal of electrooptic material with an applied electrode array, as illustrated in U.S. Pat. Nos. 3,517,200 and 3,787,111. Another type of electrooptic medium is in the form of a thin film waveguide with an applied electrode array, as illustrated in U.S. Pat. No. 3,887,885 and on page 55 of the periodical, "Physics Today", the May 1976 issue. The electric fields required to generate a periodic index of refraction variation may be applied by electrodes disposed on opposite major surfaces of the electrooptic medium to produce these fields transversely across the medium, as illustrated in the above-mentioned patents. The electric fields may also be applied from electrodes disposed on one major surface of the electrooptical medium by employing two sets of interleaved electrodes, also referred to as interdigital electrodes, that produce fringe electric fields into a major surface of the medium.

In either case, the electric fields established in the medium are employed to produce an electrooptic effect to shape the phase front of the oncoming light wave.

Recently, total internal reflection (TIR) modulating devices have come into prominence and attention. In these devices, a set of interdigital electrodes are employed on a major surface of the electrooptic medium to induce fringe electric fields into the electrooptic medium and interaction of the light beam with these fields which is assured by the grazing internal reflection of the light beam off the major surface. Examples of TIR modulators are disclosed in U.S. Pat. Nos. 3,958,862 and 4,125,318, these patents being assigned to the assignee herein.

More recently, it has been suggested to individually address an alternate set of electrodes. Voltages are applied to one set of electrodes while the other set of electrodes remain at a reference voltage level, such as, ground, to produce a phase modulation of the light beam at the location of each addressed electrode. By applying a voltage difference to a pair of electrodes, the local magnitude of the electrical fringe field between them can be controlled and varied to permit deflection of the light to a predetermined point at an image plane. For this purpose, a Fourier transform filter and imaging lens are necessary to produce a focused spot at an image plane. With proper voltage modulation across the electrodes, i.e., by addressing the electrodes in a sequential manner across the electrode array, and applying diffraction pattern filtering, a scanning spot may be produced across the image plane. These principles are disclosed in Ser. No. 040,607 filed June 21, 1979, now U.S. Pat. No. 4,281,904 and assigned to the assignee herein and entitled "TIR Electrooptic Modulator With Individually Addressed Electrodes".

SUMMARY OF THE INVENTION

The present disclosure differs in that the electrodes are addressed independently with applied voltages that vary linearly over several of the electrodes up to a predetermined value, with the pattern repeated in a periodic manner across the entire electrode array. Far field beam scanning, or beam focusing and scanning of a light spot, can thereby be accomplished.

According to this invention, an electrooptical scanning device is provided for deflection of an optical beam of light about or across an image plane. The devices includes a body of electrooptical material having a major surface with which there is associated a periodic array of substantially parallel spaced electrodes. A source of light for providing a nonconvergent wide beam of light through the body is directed at a shallow angle of incidence so as to be totally internally reflected at the electrode associated major surface. At least a portion of the length of electrodes extend in the general direction of travel of the light beam so that the wave or phase front of the beam is influenced by fringe electric fields established in the surface of the body by voltages impressed on the electrodes. The field influence can be controlled to provide a desired phase retardation along the phase front. This is accomplished by selectively addressing and applying voltages individually to and across the electrodes in a desired pattern or in a periodic, stepwise manner to produce a corresponding stepwise approximation of the desired phase retardation along the phase front of the light beam. By changing of the level of these voltages across the electrodes and the periodicity of the stepwise approximation of the phase retardation, the phase front can be systematically varied to cause the light beam to move about or scan across the image plane.

The voltages may be supplied individually to the electrodes to produce a stepwise approximation to a linear phase front across the beam. On the other hand, these voltages may be applied in a curvalinear, stepwise approximation to produce a curved phase front across the beam to bring the light continuously to a focused spot as the spot is moved about or scanned across the image plane.

The electrodes may be provided with either equal or unequal spacing. The electrodes are not interdigitally connected but rather are independently connected to a voltage supply source so as to be independently addressed, one relative another. The electrodes may be referenced to adjacent ground or reference electrodes in the manner illustrated in U.S. Pat. No. 4,281,904 or referenced to each other. By referencing the electrodes to each other, the addressed electrodes can be placed closely together compared to addressed electrodes with a reference electrode placed between each pair of such electrodes.

Other objects and attainments together with a fuller understanding of the invention will become apparent and appreciated by referring to the following descrip-

DESCRIPTION OF THE PREFERRED EMBODIMENT

Figure 1:
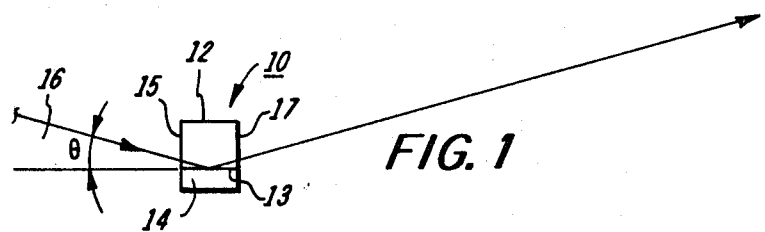
FIG. 1 schematically illustrates a side view operation of the electrooptical scanning device of the present invention.
Figure 2:
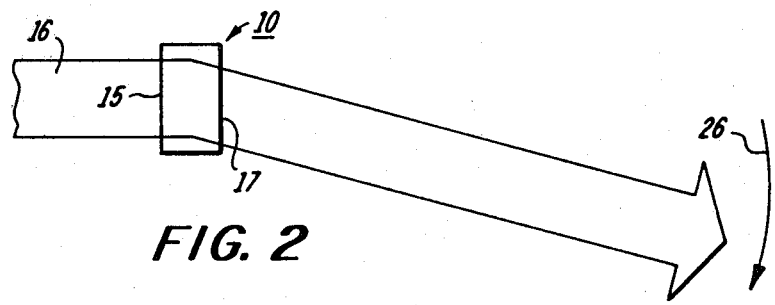
FIG. 2 is a plan view of the device shown in FIG. 1.
Figure 3:
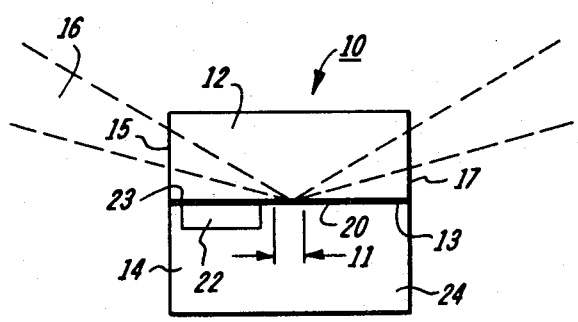
FIG. 3 is a more detail side view of the device shown in FIG. 1.

Referring to FIGS. 1 through 4, the electrooptical scanning device 10 comprises a crystal body 12 of electrooptical material and an associated electronic driving chip 14. The body 12 may be $LiNbO_3$, $LiTaO_3$, BSN, KTN, ADP, KDP, $KD^xP$ or KDA or other electrooptic material.

The chip 14 is fabricated by VLSI techniques and includes electrode driving circuitry 22 fabricated in a substrate 24, such as, silicon. An array of electrodes 20 are deposited on surface 23 of substrate 24 across the entire width of the substrate and connect to the driving circuitry 22.

The electrodes 20 function to induce electric fringe fields through surface 13 of the electronic crystal body 12 when voltages are applied to the electrodes. The coupling of these fields into the crystal body 12 is accomplished by the surface 23 of substrate 24 being pressed against the surface 13 of the body 12. Thus, the electrodes 20, supported on a separate substrate 24 are held in close contact with the electrooptic body 12 so that the electric fields created by the electrodes, when voltages are applied to the electrodes, are proximity coupled into body 12. The details of this technique of proximity coupling are disclosed in U.S. patent application Ser. No. 187,936, filed Sept. 17, 1980, assigned to the assignee herein and entitled "Proximity Coupled Electro-Optic Devices".

Alternatively, the array of electrodes 20 may be vapor deposited on the surface 13 of body 12 across its full width. The rearward end portions 25 of each electrode are coupled to an external driving circuit (not shown) which is separate from the body 12.

Alternatively, the end portions of the electrodes 20 may be solder bumped to external leadouts from an integrated driving chip 22.

The incident beam of light 16 travels in a direction generally parallel with the electrode array and is inclined by an angle $\theta$ to the body face 15. The angle $\theta$ is small in order that total internal reflection occurs at the surface 13 along a small portion of the length of the electrodes and across the entire width of the array. This electrode interreaction length with the total internally reflected light beam 16 is indicated by the arrow 11 in FIG. 3 and the dotted line region 30 in FIG. 4.

An applied voltage pattern to the electrodes 20 induces a grating effect under the influence of the electrode applied electric field which causes the total internally reflected light at surface 13 to diffract. This diffraction produces a reflected output beam from body face 17 which may be controlled in a manner to produce the scanning action indicated by the arrow 26.

Figure 4:
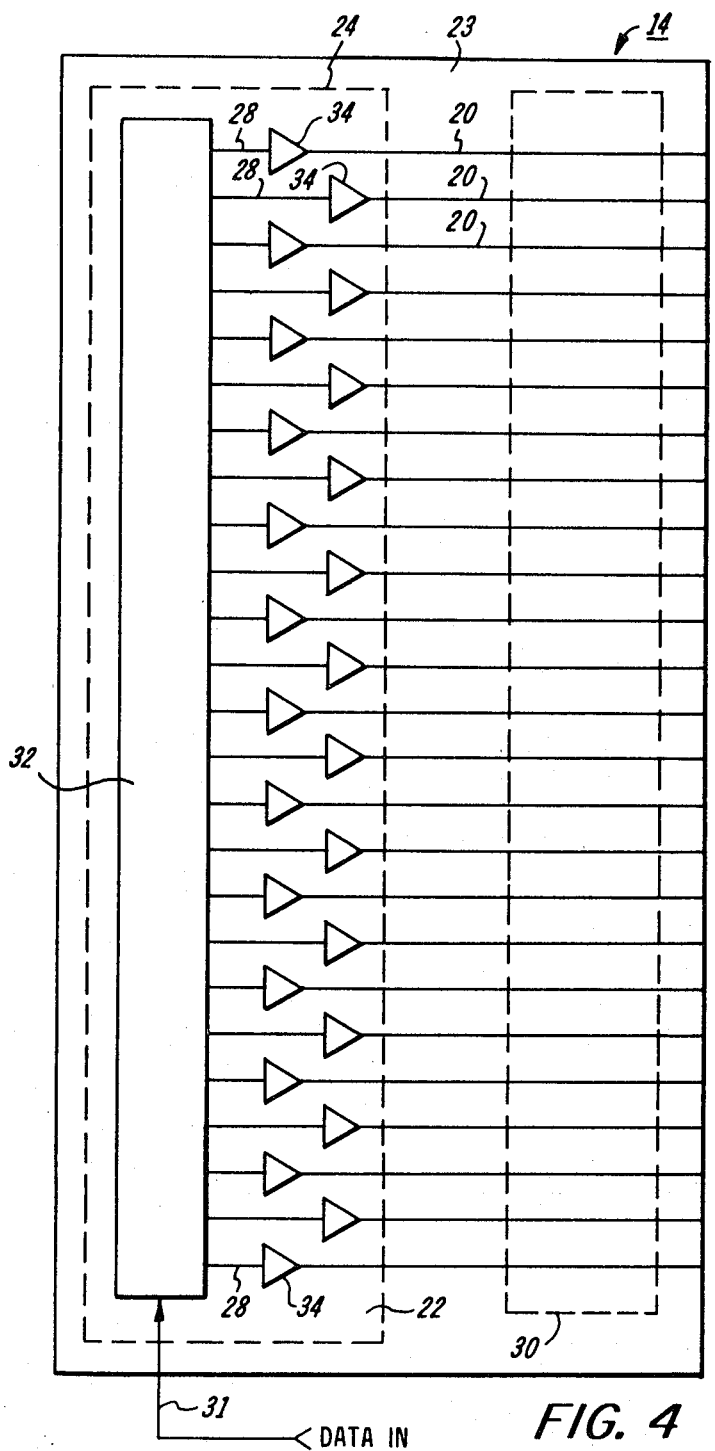
FIG. 4 is a plan view illustrating the surface electrodes and driving circuitry for the electrodes.

A plan view of surface 23 of substrate 24 is shown in FIG. 4. The VLSI circuitry 22 in chip 14 comprises a serial to parallel shift register having a data input 31 and a plurality of outputs 28 connected to each of the electrodes 20 via MOS or bipolar transistor or semiconductor switching device 34. As the data for electrode addressing is clocked into the register 32, various voltage output levels representing the serially inputed address are applied at parallel outputs 28. These outputs are then systematically strobed to the electrodes 20.

The electrode pitch relates to the beam pattern scan angle desired, since the distance between electrodes is inversely proportional to the magnitude of the scan angle, i.e., the greater the distance, the smaller the scan angle.

Electrode pitch may be on the order of 1 $\mu$m to 50 $\mu$m, for example. Applied voltages to electrodes 20, for example, may be in the range of 2 to 100 volts depending on the electrode geometry, the material used for crystal body 12 and the design of driving circuitry 22. Generally 10 to 20 volts have been achieved for electrode geometry within the previously mentioned electrode pitch range.

Figure 11:
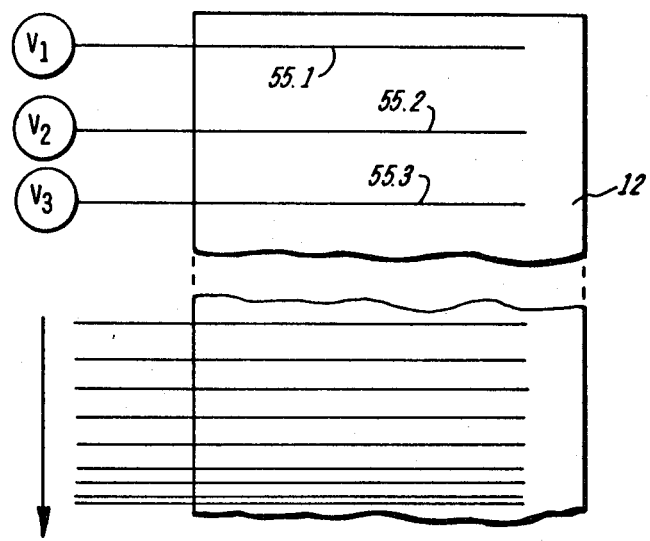
FIG. 11 is a diagrammatic illustration of the array electrodes having a varied spatial periodicity.

A variable pitch electrode arrangement may also be employed as illustrated in FIG. 11. This geometry creates a nonequally spaced pattern of electrodes 55 which will function to reduce side lobe interference and can provide focusing of the far field beam scan, eliminating the need for collimating lens where a divergent beam source is being used. The pattern shown is a linear periodic variation. A quadratic periodic variation may also be used.

Figure 5:
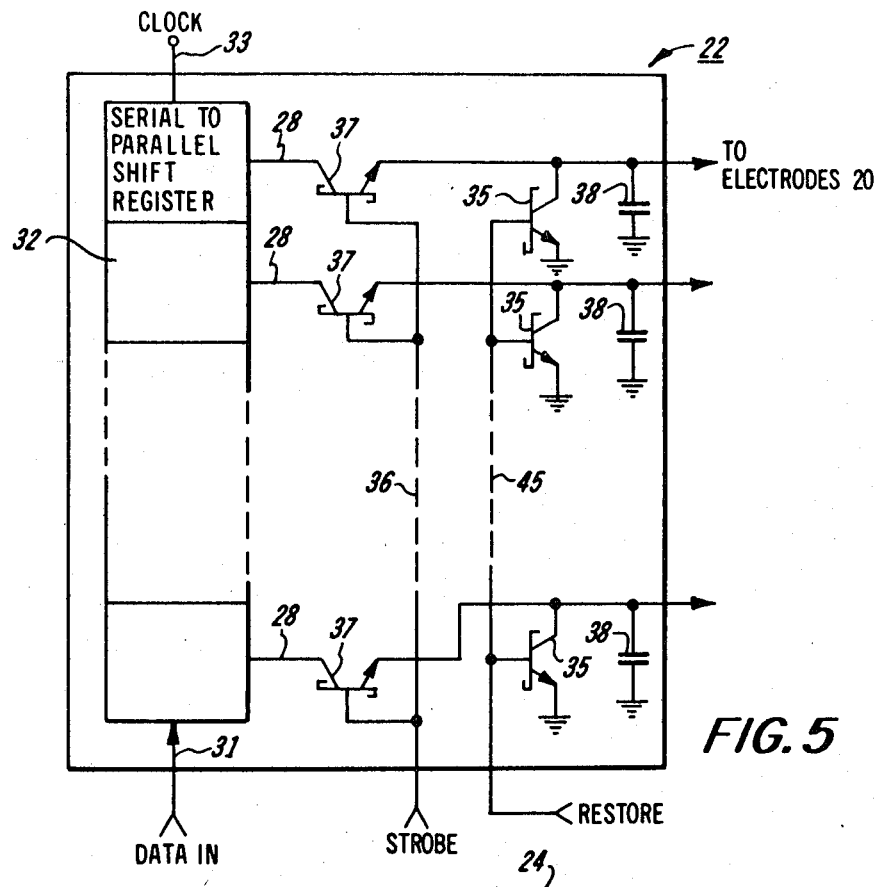
FIG. 5 is a more detailed schematic illustration of the circuitry for driving the electrode array.

Circuitry detail of the driving chip 22 for the electrodes 20 is shown in FIG. 5. The serial to parallel shift register 32 comprises a series of cells wherein the applied address pattern may be serially clocked into the register 32 by a clock signal on line 33. As the data at input 31 is clocked into shift register 32, various voltage output levels representing the serially inputed address are applied in parallel at register outputs 28. The parallel outputs 28 are placed on the electrodes 20 by means of a strobe signal on line 36 connected to the base of each switching transistor 37. The collector of each transistor 37 is connected to an output 28 and each emitter is connected to an electrode 20.

The transistor 37 may be Schottky clamped transistors for short turnoff times and greater operating speed.

The capacitors 38 are connected between ground and electrodes 20 and provide a hold circuit for the voltages applied to the electrodes 20. A restoration circuit includes the transistors 35 having their emitters connected to ground and their collectors connected to electrodes 20. The restore signal is applied on line 45 to the base of each transistor 35.

In operation, voltage levels at outputs 28 are applied to holding capacitors 38 and electrodes 20 upon application of a strobe signal on line 36. The capacitors 38 are discharged upon the application of the restore signal to the low impedance transistors 35. The next voltage values already present at outputs 28 can be strobed to the electrodes upon removal of the restore signal from line 45.

Instead of employing transistors 35 and 37, T²L drivers may be employed with register 32 and the voltage level switching may be accomplished by bipolar MOSFET transistors in place of the Schottky clamped transistors. Register 32 would be a bipolar random access memory with T²L drivers. The memory is sequentially addressed with a counter which feeds the data into the memory under clock control. The T²L drivers provide the proper voltage levels at outputs 28. These voltages are applied to electrodes 20 and capacitors 38 via the bipolar MOSFETS. Under this arrangement, applied voltage levels may be continuously changed to greater and lesser values.

Figure 6:
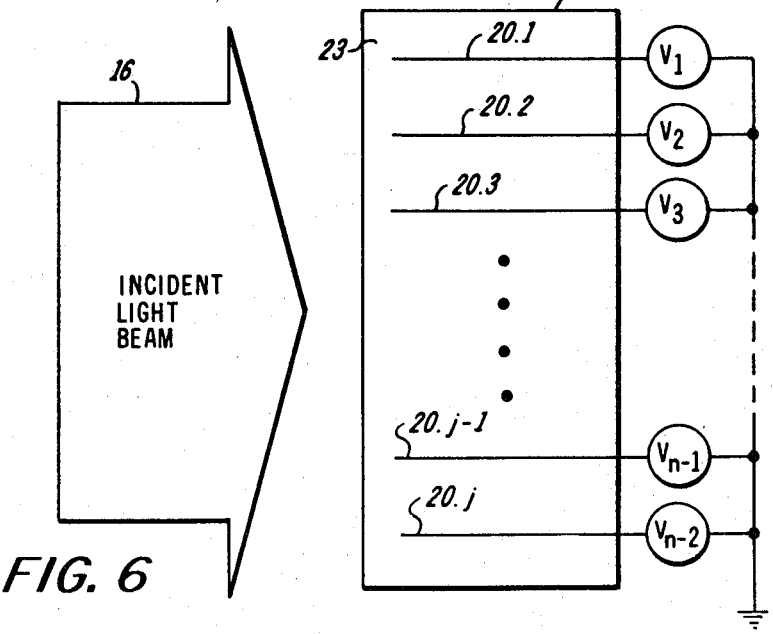
FIG. 6 is a diagrammatic illustration of the array electrodes as independently addressed across the body of electrooptical material.

As best illustrated in FIGS. 6 and 11, each of the electrode 20.1, 20.2, 20.3 ... 20.j-1 and 20.j or each of the electrodes 55.1, 55.2, 55.3 ... 55.j-1 and 55.j, respectively, is connected to its own individual drive voltage $V_1, V_2, V_3 ... V_{n-1}$ and $V_n$. There are no reference or ground electrodes. The electrodes are referenced to one another. Thus, each electrode, for example, may have a value of $n\Delta V$ between itself and an adjacent electrode 20.

The electrode arrangement in FIG. 4 of U.S. Pat. No. 4,281,904 may be used in lieu of the arrangement shown in FIG. 6 herein. For this purpose, the disclosure of U.S. Pat. No. 4,281,904 relative to electrode arrangement is incorporated herein by reference.

Voltages across the array of electrodes 20 may be applied in any desired scheme to obtain a desired scanning pattern or effect. In the case of beam scanning, the voltages are applied in a format to produce a desired phase front across the propagating beam. The voltage magnitudes are changed to correspondingly change the phase front of the light beam and thereby reposition the beams at the image plane.

The voltages would be applied across the entire array of electrodes in order to effect the entire phase front of the light beam. For large beam angles the voltages may be necessarily large due to the number of electrodes to be addressed to change the phase front. The necessity of many different voltages and voltages of undesirably high magnitude result in complex circuit design and complex scanning structure.

The problem may be solved by applying voltages up to a predetermined maximum value, $V_{max}$, in consecutive electrode groups of electrodes 20 across the electrode array. The applied voltages to each electrode group are from a minimum or reference value, starting with the first or initial electrode in each group, to a maximum value, $V_{max}$, at the last electrode in each group.

Figure 7:
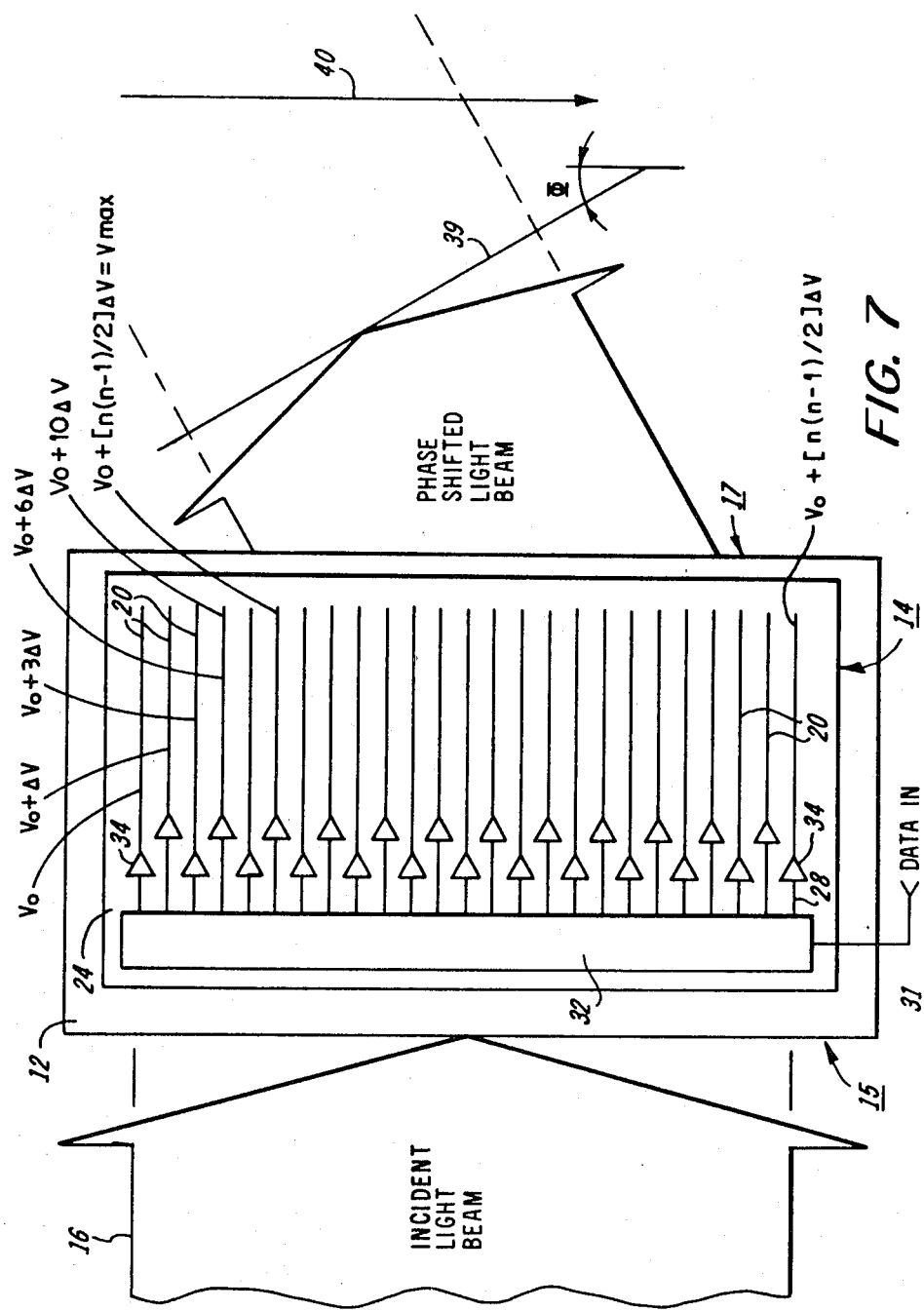
FIG. 7 is a schematic plan view illustrating electrode modulation to produce a linear phase front causing the light beam to scan across an image plane.
Figure 8:
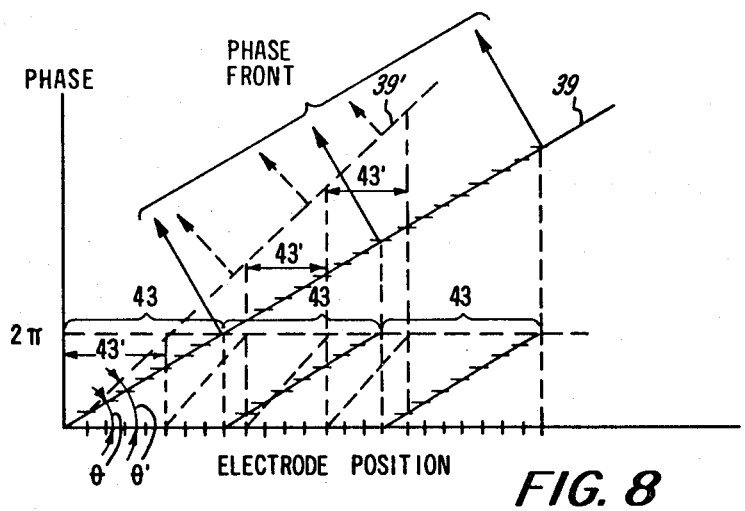
FIG. 8 is a graphic illustration of how the linear phase front is produced in FIG. 7.

The case of linear beam scanning is illustrated in FIGS. 7 and 8 for a crystal exhibiting the linear electrooptic effect. The voltages applied to electrodes 20 in each electrode group would be generally applied in a monotonic manner, i.e., they would increase or decrease from one end of the electrode group to the other. In the electrode arrangement of FIG. 7, the voltages would increase or decrease as a function of $$V_n = [n(n-1)]/2,$$

where n is the number position of the electrode in the electrode group for an instantaneous phase front. Thus, the progression in a group would be $V_o$, $V_o+\Delta V$, $V_o+3\Delta V$, $V_o+6\Delta V$, $V_o+10\Delta V$ ... $V_o+[n(n-1)/2]\Delta V$. $V_o$ is the initial electrode voltage applied in each group. This progression leads to a voltage difference between neighboring electrodes which increases linearly with n. For a device fabricated to use an electrooptic crystal exhibiting a quadratic electrooptic effect, an alternate progression formula is used so that these voltage differences increase as the square root of n.

Reference is made to electrode groups in applying a plurality of voltages to electrodes in each group across the electrode array to produce a resultant stepwise continuous change to the phase front of the propagating radiation. To produce continuous beam or spot motion at the image plane, the phase front must be continually changed. Thus, the magnitude of the voltages applied to each of the electrodes must change and the size or extent of each electrode group will change in order to approximate the change in phase retardation along the phase front.

For example, the number of electrodes per group affected to achieve stepwise approximation to a linear phase front at smaller phase shift angles, $\Phi$, will be greater. The number of electrodes affected to achieve a linear phase front at large phase shift angles, $\Phi$, will be smaller. Also, the distribution of voltages from an initial value, $V_o$, to $V_{max}$ will change. The number of electrodes involved in a group at any given time would be the amount necessary to achieve the voltage, $V_{max}$ equal to the phase shift $2\pi$ for the instant phase front 39.

In FIG. 8, a greater phase shift is illustrated by dotted lines, with a greater phase shift angle, $\Phi'$, the resulting phase front 39' is steeper and the number of electrodes per group 43' is smaller.

The value of the maximum voltage, $V_{max}$, is determined as follows.

As already indicated, a change of the applied voltage to the electrodes will create electric fringe fields into the surface 13 of the crystal body 12 which create a change in the refractive index in this light propagating medium. This means that a voltage difference, $\Delta V$, times some electrooptic constant, $C_o$, which takes into account the electrooptic effect and the geometry of the waveguide and accompanying electrode structure, provides an index of refraction change in the medium, i.e., $\Delta V C_o = \Delta n$, for a linear electrooptic crystal.

The fringe electric fields created by the applied voltages will react over a certain portion of the length of the electrodes, which portion will interact with the incident light. This length is designated as interaction length, L, and is represented by the electrode portions shown by arrow 14 in FIG. 3 or the lengths within the dotted rectangle 30 in FIG. 4. The total refractive index change over the electrode interaction length is represented by L or $$C_o L \Delta V = L \Delta n.$$

Wave propagation in a waveguide medium may be generally identified as $e^{i\beta Z}$, wherein $\beta$ is the propagation constant. Over a length L, the wave propagation is $e^{i\beta L}$ and the propagation phase is represented $\beta L$. $\beta$ is also equal to $K_o n$, wherein n is equal to equivalent index of refraction for the waveguide geometry and crystal material and $K_o$ is equal to $2\pi$ divided by the wavelength, $\lambda_o$, in free space. Therefore, the propagation phase, BL equals $K_o L n$.

By applying the electric field to crystal body 12 with a voltage change, $\Delta V$, from electrode to electrode, a change in the index of refraction is also experienced so that the phase change is represented by $K_o \Delta n L$ and is equal to $C_o K_o L \Delta V$. When a phase change $\beta L$ is equal in value to $2\pi$, there is no phase change since this propagation phase change may be expressed as $$e^{i\beta L} = e^{i(\beta L - 2\pi P)}$$

where $$P = 0, +1, +2, \ldots \text{ and}$$

P is a mathematical and physical identity. When the phase change, $C_o K_o L \Delta V$ equals $2\pi$, the voltage applied to the electrodes may be reduced to the initial reference voltage or zero voltage and the process repeated for the next consecutive group of electrodes. The resultant effect is a varied voltage application to successive groups of the electrodes across the electrode array at any instantaneous point of time. This produces a corresponding stepwise approximation of the desired phase retardation along the phase front of the light beam.

In the case of a linear phase front change, this would be a sawtooth voltage step function across the array. As shown in FIG. 7, the resultant effect on the propagating light is the creational appearance of a single linear phase or wave front 39 across the width of the light beam 16 propagating at an angle $\Phi$ relative to line perpendicular to the incident light beam 16. The maximum voltage for each sawtooth function is $2\pi$ and may be represented by $\Delta V_{max}$ wherein $$\Delta V_{max} = [(2\pi)/(C_o K_o L)] = [(\lambda_o)/(C_o L)].$$

The greater the interaction length, L, the smaller the voltage applied to the electrodes 20 and the smaller the ultimate value of $\Delta V_{max}$.

The linear phase front 39 is illustrated in FIG. 8 relative to phase and electrode position across the array. As just discussed, the voltages are applied from a reference voltage monotonically ($V_o$, $V_o + \Delta V$, $V_o + 3\Delta V$, $V_o + 6\Delta V$, $V_o + 10\Delta V$, $V_o + 15\Delta V \ldots$ ) across the electrodes until the value $V_{max}$ is reached, which is equivalent to the phase value $2\pi$. The applied voltage for the next succeeding electrode in the next electrode group is reduced to the reference voltage, $V_o$. As illustrated in FIG. 8, this process is repeated for consecutively identified electrode groups 43. This periodic step function of these applied voltages will produce a corresponding stepwise approximation of a monotonic phase retardation along the phase front. However, the actual light beam phase front 39 will appear linear.

The clocking of the shift register 32 provides for the different voltages to be applied in the manner illustrated in FIG. 8. The scanning of the far field beam, indicated by arrow 40 in FIG. 7, is accomplished by varying the magnitude of the voltages applied across the electrodes 20 and the periodicity of the stepwise approximation of the phase front to vary the relative appearance of the phase retardation along the entire phase front in a continuous manner. This is produced by applying a continuous stream serial data input to shift register 32 with each completed serial input representing a particular phase front. Voltages at the outputs 28 represent each positional address of the serial input. As the voltage outputs 28 are applied to electrodes 20, simultaneously the next serial input for next phase front is being loaded into the shift register 32 at input 31. The addressing electronics necessary for applying such a serial input is well known in the art.

As a practical application, a semiconductor injection laser or He-Ne laser with an expanded and collimated light beam may be used as a source for the light beam 16. The laser wavelength may be 6328 A and the electrode pitch may be 5 $\mu$m. The voltage, $V_{max}$, will be about 3.14 volts. The angular scan will be about 7° and the addressing rate provided by the driving circuitry 22 is about 10 MHz or greater.

In the special case of beam focusing and spot scanning, the applied voltages would appear as groups of curvalinear functions.

The voltage change and relationship from electrode to electrode is not the same as in linear beam scanning because the required phase front is quadratic or curvalinear.

Figure 10:
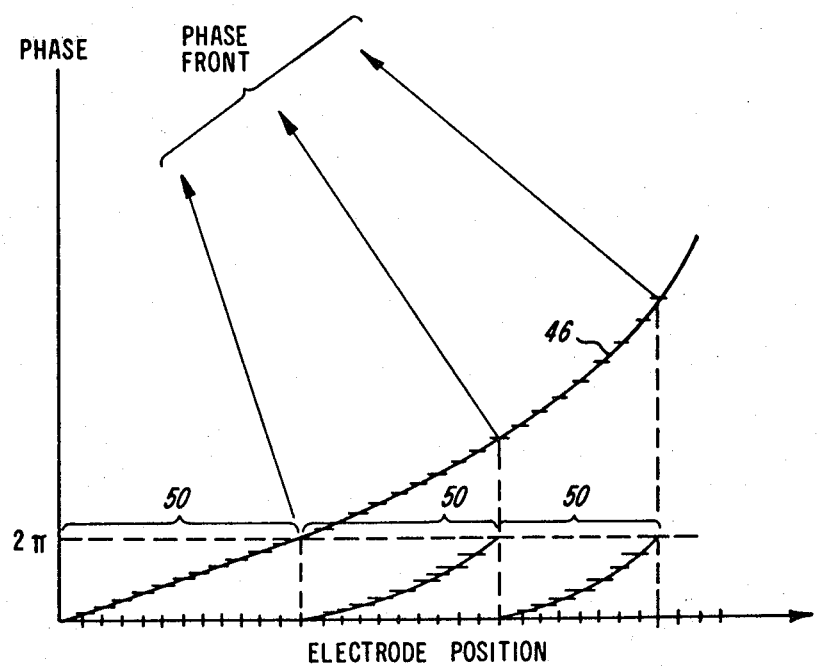
FIG. 10 is a graphic illustration of how the curvalinear phase front is produced in FIG. 9.
Figure 9:
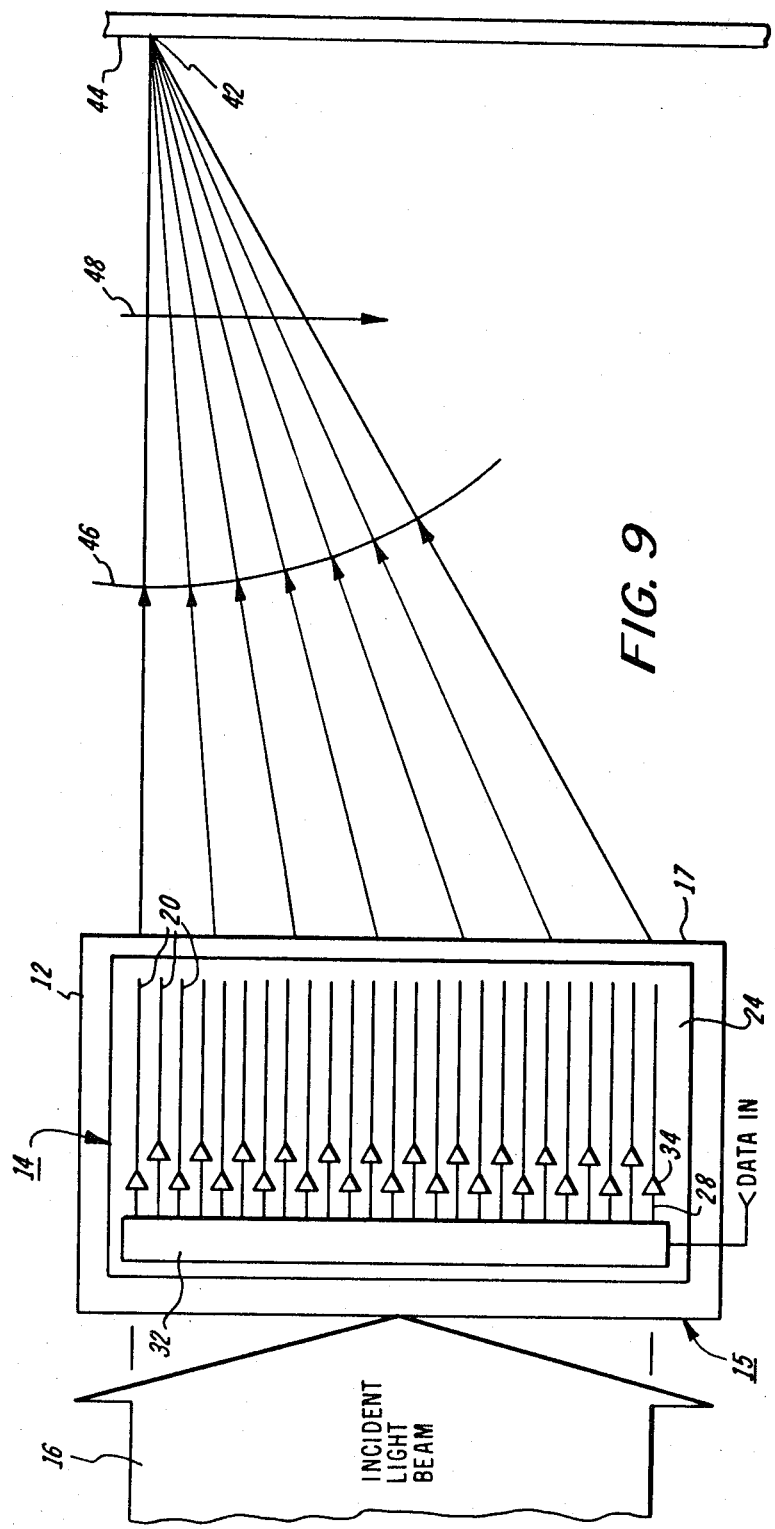
FIG. 9 is a schematic plan view illustrating electrode modulation to produce a curvalinear phase front causing the light beam to focus to a spot for scanning across an image plane.

Referring to FIGS. 9 and 10, the number of electrodes in electrode groups 50 for an instantaneous phase front will not be of an equal number. This is because the phase front is curvalinear. The shape of phase front 46 is designed to reflect portions of the light so that the beam will be focused to a spot 42 on image plane 44. The spot 42 is caused to scan across the image plane 44 (indicated by arrow 48) by periodically changing the magnitude of the applied voltages across the electrode array so that some of the applied voltages will be increasing while others will be decreasing to maintain the curvalinear form and focus the incident beam to spot 42 as it is displaced from point to point across the image plane 44 (pixel to pixel) by systematic electrode addressing.

Whether a linear or curvalinear phase front, the return scan of the far field beam is accomplished by applying voltages across the electrode array in a direction and addressing pattern opposite to that illustrated in FIGS. 8 and 10.

Figure 12:
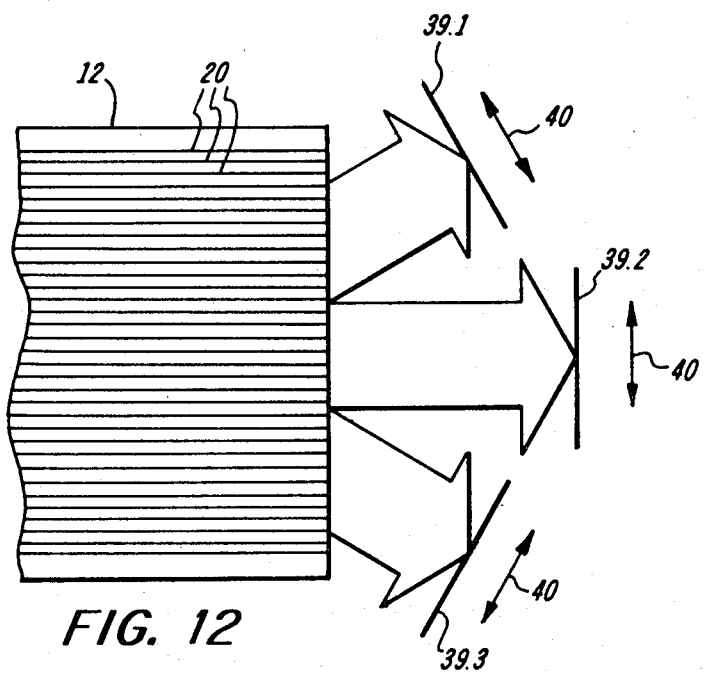
FIG. 12 is a diagrammatic illustration of beam splitting and multiple beam scanning.
Figure 13:
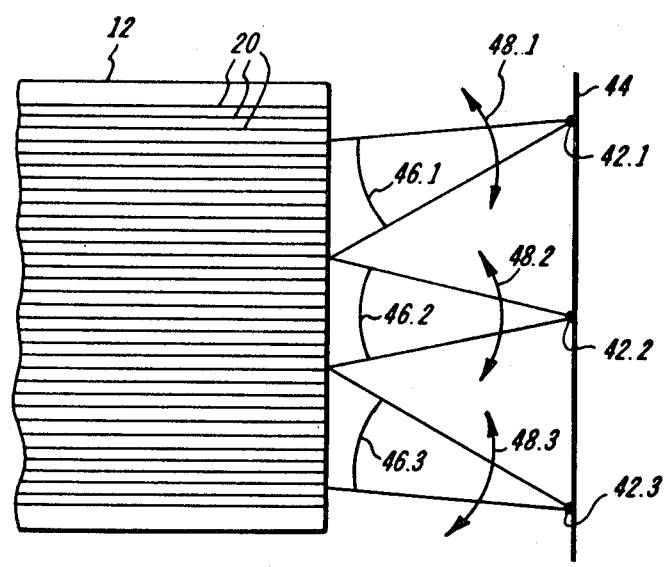
FIG. 13 is a diagrammatic illustration of beam splitting, and multiple beam focusing and spot scanning.

Applications of the addressing scheme disclosed is not limited to scanning. For example, voltages to electrodes 20 may be applied to discrete electrode groups to produce separate beams or spots, as illustrated in FIGS. 12 and 13. These beams and spots may, in turn, be moved in any desired path or pattern across the image plane or scanned across the image plane in an independent sequential or simultaneous manner. Electrode addressing would be the same except accomplished in multiple across the electrode array.

While the invention has been described in conjunction with specific embodiments, it is evident that many alternatives, modifications and variations will be apparent to those skilled in the art in light of the foregoing description. Accordingly, it is intended to embrace all such alternatives, modifications, and variations as fall within the spirit and scope of the appended claims.

What we claim is:

1. An electrooptical scanning device for deflection of an optical beam of light across an image plane comprising
    a body of electrooptical material,
    a source of light for providing a wide beam of light through said body such that the light suffers a single internal reflection from a major surface of said body,
    a periodic array of spaced electrodes associated with said major surface of said body, at least a portion of the lengths of said electrodes extending in the general direction of travel of said light beam and arranged, in response to a voltage applied thereto, to provide an electric field in said body along said electrode portions to influence the deflection of said light beam at the point of said internal reflection at said major surface,
    circuit means to individually address each of said electrodes with a selected voltage, the manner of voltage selection to be applied by said circuit means across said electrodes and characterized in that the voltages selected approximte the instantaneous phase retardation desired along the phase front of said light beam, said selection comprising the division of said electrodes into groups serially across said electrode array wherein the voltage values are applied to the electrodes in each electrode group starting from a minimum voltage value at the first electrode of each group and progressing monotonically to a maximum voltage value at the last electrode of each group, the monotonical representation of said voltage progression across each electrode group being an approximation of the instantaneous phase retardation along the phase front of said light beam associated with each electrode group,
    a change in the instantaneous phase retardation desired along the phase front of said light beam accomplished by changing the number of electrodes in each group in combination with a change in said maximum voltage value and monotonical voltage progression across said electrode groups so that the monotonical representation of said voltage progression across each electrode group approximates a new phase retardation for said light beam representing a new phase front for said light beam.

2. The scanning device of claim 1 wherein the spatial periodicity of said electrodes is equal.

3. The scanning device of claim 1 wherein the spatial periodicity of said electrodes is unequal.

4. The electrooptical scanning device of claim 1 wherein said monotonical representation across each electrode group is linear and at an angle approximating the phase shift angle of the phase front for said light beam exiting said device and being a sawtooth stepwise approximation across said electrode array of the instantaneous phase retardation desired along the phase front of said light beam.

5. The electrooptical scanning device of claim 1 wherein said monotonical representation across each electrode group is curvalinear and each electrode in each group having a voltage magnitude representative of phase retardation approximating the phase shift angle necessary for focusing said light beam at the positional point of each group electrode at a single spot at an image plane positioned beyond said device and being a sawtooth stepwise approximation across said electrode array of the instantaneous phase retardation desired along the phase front of said light beam to focus said light beam at said image plane spot.

6. The electrooptical scanning device of claim 1 wherein said electrode array is divided into discrete groups of electrodes, each discrete group to influence the deflection of said light beam at the point of said internal reflection at said major surface independent of the other of said groups, the manner of voltage selection to be applied by said circuit means across the electrodes of each discrete group characterized in that the voltages selected approximate the instantaneous phase retardation desired along the phase front of the portion of said light beam associated with a particular discrete group, said selection comprising the division of said electrodes in each discrete group into subgroups serially across said each discrete group wherein the voltage values are applied to corresponding electrodes in each electrode subgroup starting from a minimum voltage value at the first electrode of each subgroup and progressing monotonically to a maximum voltage value at the last electrode of each subgroup, the monotonical representation of said voltage progression across each electrode subgroup of each of said discrete electrode groups being a stepwise approximation of the instantaneous phase retardation along the phase front of the light beam portion associated with a particular discrete group,
    a change in the instantaneous phase retardation desired along the phase front of said light beam portions accomplished by changing the number of electrodes in each subgroup in combination with a change in said maximum voltage value and monotonical voltage progression across said electrode subgroups so that the monotonical representation of said voltage progression across each electrode subgroup approximtes a new phase retardation for each of said light beam portions representing a new and different phase front for each of said light beam portions.

7. The electrooptical scanning device of claim 6 wherein said monotonical representation across each electrode subgroup is linear and at an angle approximating the phase shift angle of the phase front for each of said light beam portions exiting said device and being a sawtooth stepwise approximation across each of said discrete electrode groups of the instantaneous phase retardation along the phase front of each of said light beam portions.

8. The electrooptical scanning device of claim 6 wherein said monotonical representation across each electrode subgroup is curvalinear and each electrode in each subgroup having a voltage mangitude representative of phase retardation approximating the phase shift angle necessary for focusing said light beam portion at the positional point of each subgroup electrode at a single spot at an image plane positioned beyond said device and being a sawtooth stepwise approximation across each of said discrete electrode groups of the instantaneous phase retardation desired along the phase front of each of said light beam portions to focus each of said light beam portions at a different spot at said image plane.

9. The electrooptical scanning device of claim 1 wherein said electrodes are disposed on said body major surface.

10. The electrooptical scanning device of claim 1 wherein said electrodes are disposed on a major surface of a substrate, said substrae major surface being brought into engagement with and pressed against said body major surface.

11. An electrooptical scanning device for deflection of an optical beam of light across an image plane comprising
   a body of electrooptical material,
   a source of light for providing wide beam of light through said body such that the light suffers a single internal reflection from a major surface of said body,
   a periodic array of spaced electrodes associated with said major surface of said body, at least a portion of the lengths of said electrodes extending in the general direction of travel of said light beam and arranged, in response to a voltage applied thereto, to provide an electric field in said body along said electrode portions to influence the deflection of said light beam at the point of said internal reflection at said major surface,
   circuit means to individually address each of said electrodes with a selected voltage, the manner of voltage selection to be applied by said circuit means across said electrodes characterized in that the voltages selected approximate the instantaneous phase retardation desired along the phase front of said light beam, said selection comprising the division of said electrodes into groups serially across said electrode array wherein the voltage values are applied to the electrodes in each electrode group starting from a minimum voltage value at the first electrode of each group and progressing monotonically to a maximum voltage value at the last electrode of each group, the slope representation of the progression of said voltages across each electrode group being a sawtooth stepwise approximation of the instantaneous phase retardation along the phase front of said light beam,
   a change in the instantaneous phase retardation desired along the phase front of said light beam accomplished by changing the number of electrodes in each group in combination with a change in said maximum voltage value and monotonical voltage progression across said electrode groups so that the angle of the slope representation of the voltage progression across each electrode group approximates a new phase shift angle of said light beam representing a new phase front for said light beam.

12. The electrooptical scanning device of claim 11 wherein the voltage values applied to corresponding electrodes in each electrode group are voltage referenced to an adjacent electrode by an amount, $\Delta V$, with the first electrode of each group starting a minimum voltage value, $V_o$, and the voltages across the electrodes in the group progressing monotonically according to $V_n = n(n-1)/2$, wherein n is the number position of an electrode in each group, to a maximum voltage value, $V_{max} = V_o + [n(-1)/2]\Delta V$, at the last electrode of each group.

13. The electrooptical scanning device of claim 12 wherein wherein the monotonical progression accross an electrode group is $V_o$, $V_o + \Delta V$, $V_o + 3\Delta V$, $V_o + 6\Delta V$, $V_o + 10\Delta V$, $V_o + 15\Delta V$, . . . , $V_o + [n(n-1)/2]\Delta V$, the latter value being equivalent to the phase value $2\pi$.

14. An electrooptical scanning device for deflection of an optical beam of light across an image plane comprising
   a body of electrooptical material,
   a source of light for providing a wide beam of light through said body such that the light suffers a single internal reflection from a major surface of said body,
   a periodic array of spaced electrodes associated with said major surface of said body, at least a portion of the lengths of said electrodes extending in the general direction of travel of said light beam and arranged, in response to a voltage applied thereto, to provide an electric field in said body along said electrode portions to influence the deflection of said light beam at the point of said internal reflection at said major surface.
   circuit means to individually address each of said electrodes with selected voltages, the manner of voltage selection to be applied by said circuit means across said electrodes characterized in that the voltages selected approximate the instantaneous phase retardation to provide a given intantaneous phase front of said light beam, said selection comprising the division of said electrodes into groups of equal number serially across said electrode array wherein the voltage valves are applied to corresponding electrodes in each electrode group so that each electrode is voltage referenced to an adjacent electrode by an amount, $\Delta V$, starting from a minimum voltage value, $V_o$, at the first electrode of each group and progressing monotonically according to $V_n = n(n-1)/2$, wherein n is the number position of an electrode in each group for the instantaneous phase front, to a maximum voltage value, $V_{max} = V_o + [n(n-1)/2]\Delta V$, at the last electrode of each group, the slope representation of the progression of said voltages across each electrode group being a sawtooth stepwise approximation of the instantaneous phase retardation along the phase front of said light beam,
   a change in the instantaneous phase retardation desired along the phase front of said light beam accomplished by changing the number of electrodes in each group in combination with a change in said maximum voltage value and monotonical voltage progression across said electrode groups so that the angle of the slope representation of said voltage progression across each electrode group approximates a new phase shift angle, $\Phi$, of said light beam representing a new instantaneous phase front for said light beam.

15. The scanning device of claim 14 wherein the spatial periodicity of said electrodes is equal.

16. The scanning device of claim 14 wherein the spatial periodicity of said electrodes is unequal.

17. The electrooptical scanning device of claim 14 wherein the value for $V_{max}$ for an instantaneous phase front is equal to $\lambda_o/C_oL$ where $\lambda_o$ is the wavelength of said light beam in free space, $C_o$ is an electrooptic constant and L is the length of the electrodes interacting with said light beam at said internal reflection point.

18. The electrooptical scanning device of claim 14 wherein said electrode array is divided into discrete groups of electrodes, each discrete group to influence the deflection of said light beam at the point of said internal reflection at said major surface independent of the other of said groups, the manner of voltage selection to be applied by said circuit means across the electrodes of each discrete group characterized in that the voltages selected approximate the instantaneous phase retardation desired along the phase front of the portion of said light beam associated with a particular discrete group, said selection comprising the division of said electrodes in each discrete group into subgroups serially across said each discrete group wherein the voltage values are applied to corresponding electrodes in each electrode subgroup starting from a minimum voltage value at the first electrode of each subgroup and progressing monotonically to a maximum voltage value at the last electrode of each subgroup, the monotonical representation of said voltage progression across each electrode subgroup of each of said discrete electrode groups being a stepwise approximation of the instantaneous phase retardation along the phase front of the light beam portion associated with a particular discrete group.

a change in the instantaneous phase retardation desired along the phase front of said light beam portions accomplished by changing the number of electrodes in each subgroup in combination with a change in said maximum voltage value and monotonical voltage progression across said electrode subgroups so that the monotonical representation of said voltage progression across said electrode subgroup approximates a new phase retardation for each of said light beam portions representing a new and different phase front for each of said light beam portions.

19. The electrooptical scanning device of claim 18 wherein said monotonical representation across each electrode subgroup is linear and at an angle approximating the phase shift angle of the phase front for each of said light beam portions exiting said device and being a sawtooth stepwise approximation across each of said discrete electrode groups of the instantaneous phase retardation along the phase front of each of said light beam portions.

20. The electrooptical scanning device of claim 28 wherein said electrodes are disposed on said body major surface.

21. The electrooptical scanning device of claim 14 wherein said electrodes are disposed on a major surface of a substrate, said substrate major surface being brought into engagement with and pressed against said body major surface.

22. The method of deflecting an optical beam of light across an image plane wherein a periodic array of spaced electrodes are associated with a major surface of a body of electrooptical material and individually addressable with a selected voltage and comprising the steps of providing a wide beam of light through said body such that the angle of incidence causes the light to suffer a single internal reflection from said major surface, applying voltages to the electrodes across said array such that the voltages selected approximate the instantaneous phase front desired along the phase front of said light beam, the step of voltage selection across said array characterized by dividing said electrodes into groups serially across said electrode array, selecting voltage values for the electrodes in each group such that the first electrode of each group has a minimum voltage value for the group and the last electrode of each group has a maximum voltage value for the group and wherein the voltages applied to the electrodes between said first and last group electrodes is a monotonical progression, the monotonical representation of said voltage progression across each electrode group being an approximation of the instantaneous phase retardation along the phase front of said light beam associated with the electrode group at said point of internal reflection, changing the instantaneous phase retardation along the phase front of said light beam causing said light beam to deflect, the step of changing the instantaneous phase retardation characterized by changing the number of electrodes designated in each group, changing the value said maximum voltage value in said electrode groups and changing the monotonical voltage progression across said electrode groups such that the monotonical representation of said voltage progression across each electrode group approximates a new phase retardation for said light beam representing a new phase front for said light beam.

* * * * *